United States Patent [19]

Takebayashi

[11] Patent Number: 4,939,532
[45] Date of Patent: Jul. 3, 1990

[54] MOUNT APPARATUS OF INTERCHANGEABLE LENS CAMERA

[75] Inventor: Tatsuhide Takebayashi, Tokyo, Japan

[73] Assignee: Asahi Kogaku Kogyo Kabushiki Kaisha, Tokyo, Japan

[21] Appl. No.: 301,982

[22] Filed: Jan. 26, 1989

[30] Foreign Application Priority Data

Feb. 5, 1988 [JP] Japan ............................. 63-13599[U]

[51] Int. Cl.$^5$ ............................................. G03B 17/00
[52] U.S. Cl. ................................................... 354/286
[58] Field of Search ........................................ 354/286

[56] References Cited

U.S. PATENT DOCUMENTS

| 4,357,089 | 11/1982 | Okura et al. | 354/286 |
| 4,564,265 | 1/1986 | Miki | 354/286 |
| 4,748,467 | 5/1988 | Maekawa et al. | 354/286 |

FOREIGN PATENT DOCUMENTS

WO8704807 8/1987 European Pat. Off. .

Primary Examiner—Brian W. Brown
Attorney, Agent, or Firm—Sandler, Greenblum & Bernstein

[57] ABSTRACT

A mounting apparatus for an interchangeable lens camera has a mount lock member which is provided on a body mount of a camera body and which can be disengageably engaged in a lock hole on the interchangeable lens mount. A mount lock releasing member moves in association with the mount lock member and retracts the mount lock member from the body mount when the mount lock member is pushed in. Contact members on the body mount and the lens mount are brought into contact with each other when the interchangeable lens is locked to the camera body, wherein the contact members provided on the camera body have contact pins which can retractably project from the body mount and which are continuously biased to project from the body mount. When the mount lock member is retracted from the body mount, the contact pins are also retracted from the body mount.

14 Claims, 4 Drawing Sheets

MOUNT APPARATUS OF INTERCHANGEABLE LENS CAMERA

BACKGROUND OF THE INVENTION

1. Field of the invention

The present invention relates to an interchangeable lens camera and more precisely it relates to a mount apparatus of an interchangeable lens camera in which electrical contacts for photographing signals and/or for power supply are provided on mount surfaces of a camera body and an interchangeable lens which is to be detachably attached to the camera body.

2. Description of Related Art

In an interchangeable lens camera, a mount lock member is provided on a body mount to be disengageably engaged in a lock hole of a lens mount, so that the mount lock member is retracted from the body mount by pushing a mount lock releasing member to release the lock. In an interchangeable lens camera which has a driving motor for an automatic focusing device (on the interchangeable lens side), and a diaphragm driving device, etc. on the camera body, a joint shaft (drive shaft) which functionally connects the driving motor and a driving mechanism on the interchangeable lens side is additionally provided on the body mount. The joint shaft which is continuously biased into a projected position is retractable from the body mount surface. In this kind of interchangeable lens camera, it is necessary to provide an electrical connecting means for transmitting various photographing information between the camera body and the interchangeable lens or for supplying the electrical power from an electrical power source provided in the camera body to the driving motor. There are various known electrical connecting means. For example, as disclosed in PCT Application No. JP87/00067 and U.S. Pat. No. 4,564,265, it is known to provide contact members on the body mount and the lens mount so as to establish an electrical connection therebetween when the mounts are connected to each other. However, in this type of connection in which the contact members are provided on the mounts, a transmission loss tends to occur due to the contact resistance therebetween. To avoid this, the contact surfaces are usually subject to a surface treatment for reducing the contact resistance. However, the solution by the surface treatment has a drawback because the surface treatment layers can be easily stripped or separated from the body of the associated contact members due to a repeated rubbing between the mount surfaces upon mounting and dismounting the lens mount to and from the body mount, thus resulting in wearing of the surface treatment layers or poor contact between the contact members.

SUMMARY OF THE INVENTION

The primary object of the present invention is to provide a mount apparatus of an interchangeable lens camera in which contact members are provided on the mount surfaces of the camera body and the interchangeable lens, which can prevent the contact members from rubbing against each other and from being worn upon mounting and dismounting the interchangeable lens to and from the camera body.

The inventor of the present invention has conceived an interchangeable lens camera, a mount lock member and a mount lock releasing member are provided, so that when the mount lock releasing member is pushed in, the mount lock member is retracted from the mount. If the contact members are also retracted from the mount surface in association with the mount lock member and the mount lock releasing member, wearing of the contact members upon mounting and dismounting the interchangeable lens can be decreased or prevented.

To achieve the object mentioned above, a mount apparatus of an interchangeable lens camera has a mount lock member which is provided on a body mount of a camera body and which can be disengageably engaged in a lock hole provided on the interchangeable lens mount, a mount lock releasing member which moves in association with the mount lock member and which retracts the mount lock member from the body mount when the mount lock member is pushed in, and contact members on the body mount and the lens mount which are brought into contact with each other when the interchangeable lens is locked to the camera body. According to the present invention, the contact member provided on the camera body is composed of a contact pin (or pins) which can retractably project from the body mount and which is biased to project from the body mount, so that the contact pin(s), the mount lock releasing member and the mount lock member are associated with each other in such a way that when the mount lock member is retracted from the body mount, the contact pin(s) is (are) also retracted from the body mount.

Although the contact pins can be used both to transmit the photographing data and to supply the electrical power, they can be particularly advantageously used for the power supply, especially since the problem of increased contact resistance is more serious in the power supply.

BRIEF DESCRIPTION OF THE DRAWINGS

The invention will be explained below in detail with reference to the accompanying drawings which show an embodiment of the present invention, in which.

DETAILED DESCRIPTION OF PREFERRED EMBODIMENT

Figure 6:
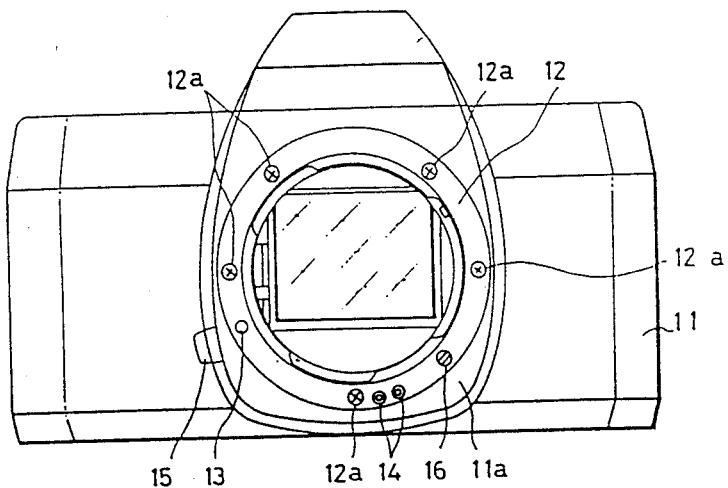
FIG. 6 is a front elevational view of a camera body according to the present invention; and, FIG. 7 is a perspective view of an interchangeable lens.
Figure 7:
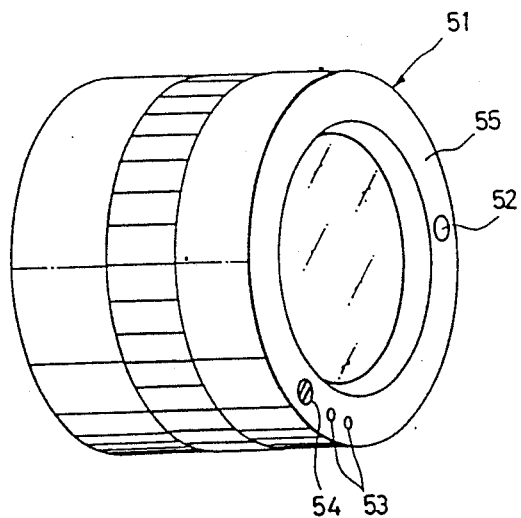

First, which reference to FIGS. 6 and 7 which show a camera body 11 and an interchangeable lens 51 in an automatic focusing single-lens reflex camera to which the present invention is applied, a body mount 12 is secured to the camera body 11 by set screws 12a onto an outer decoration member 11a. The body mount 12 has a mount lock member 13 which locks the interchangeable lens 51 in a mounting position, a pair of contact pins 14 which constitute one of the most important features of the present invention, as will be described hereinafter, and an AF (Auto Focus) joint shaft (drive shaft) 16 which is rotated by a drive source in the camera body 11. On the side face of the outer decoration member 11a is provided a mount lock releasing member (unlocking member) 15 which releases the lock member 13 of the interchangeable lens and which can be pushed in a direction parallel to the optical axis.

The mount lock member 13 can be fitted in a lock hole 52 which is provided on a lens mount 55 of the interchangeable lens 51 to lock the same onto the camera body 11. In the locked position mentioned above, a pair of contact pins 14 and the AF joint shaft 16 are engaged by a pair of contact members 53 and a driven shaft 54, respectively. The contact pins 14 and the contact members 53 are used to supply power from the camera body 11 to, for example, a motor (not shown) for a power zoom mechanism incorporated in the interchangeable lens 51 or to transmit photographing data, such as focal length or diaphragm data or the like from the interchangeable lens 51 to the camera body 11. The driven shaft 54 is associated with the driving mechanism of a focus adjusting lens to receive the rotation of the AF joint shaft 16 over an angular displacement corresponding to the object distance signal from the focus detecting device in order to move the focus adjusting lens to a focal point.

Figure 1:
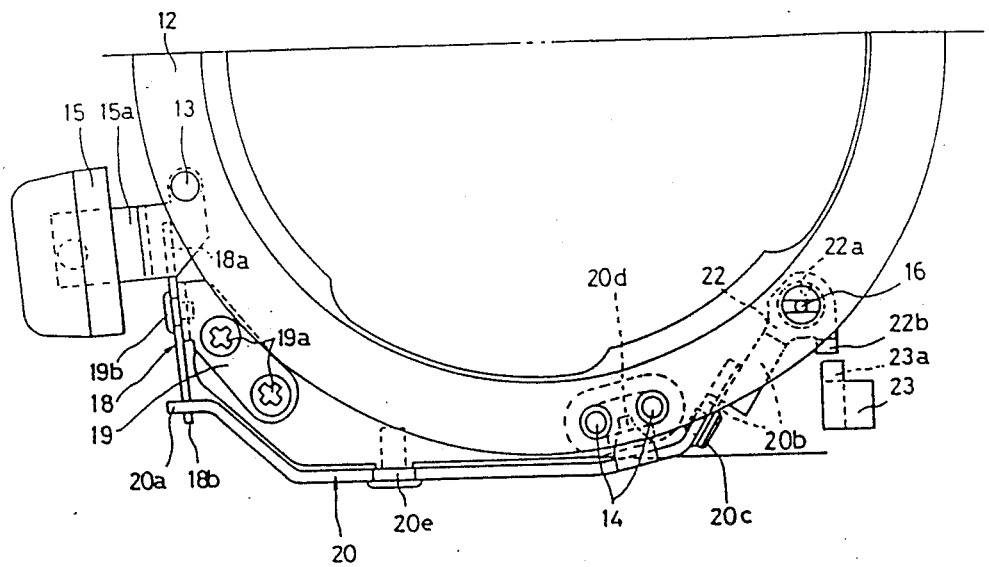
FIG. 1 is a front elevational view of a main part of a mount apparatus in an interchangeable lens camera according to an aspect of the present invention.
Figure 2:
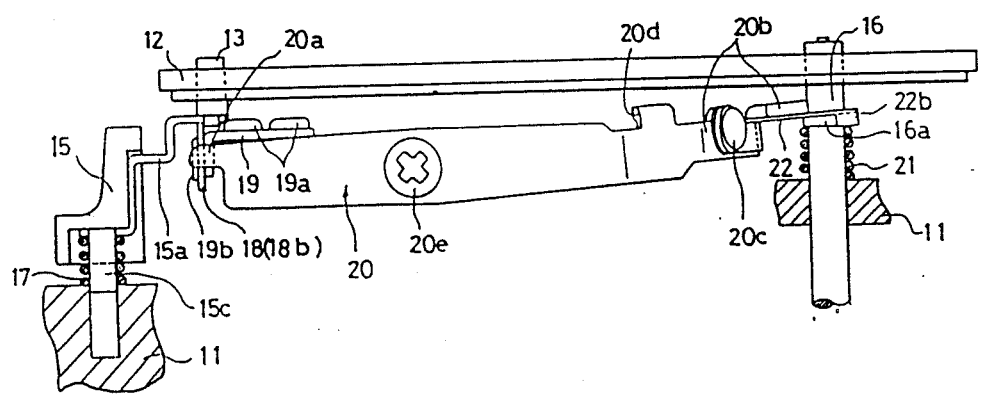
FIG. 2 is a bottom view of FIG. 1.

The mount lock releasing member 15 has an arm 15a which projects toward the body mount 12, as shown in FIGS. 1 and 2. The mount lock member 13 is secured to the arm 15a. The mount lock releasing member 15 has a guide pin 15c integral therewith which is slidably inserted in the camera body 11 so as to move in a direction substantially parallel with the optical axis. The mount lock releasing member 15 is continuously biased by a compression spring 17, so that the mount lock member 13 tends to project from the body mount 12.

The arm 15a of the mount lock releasing member 15 is engaged by an upper arm 18a of a first intermediate lever 18. The first intermediate lever 18 is pivoted to a substantially horizontal shaft 19b of a lever support 19 secured to the camera body 11 by set screws 19a so as to swing in the forward and backward directions when viewed the front. The upper arm 18a and the lower arm 18b of the first intermediate lever 18 are located above and below the upper and lower ends of the shaft 19b.

A second intermediate lever 20 is rotatably supported by a vertical shaft 20e provided on the bottom of the camera body 11. The second intermediate lever 20 has at its opposite ends upwardly extending association arms 20a and 20b, so that the lower arm 18b of the first intermediate lever 18 can be associated with the association arm 20a. The association takes place only in one direction. That is, when the lower arm 18b rotates in the forward direction, it rotates the association arm 20a of the second intermediate lever 20 together in the same direction, but when the association arm 20a moves forward, no movement of the first intermediate lever 18 occurs.

The AF joint shaft 16 is fitted in a hole formed in the body mount 12 to rotate and move in the axial direction, so that the front end of the AF joint shaft can be projected from and retracted into the surface of the body mount 12. The AF joint shaft 16 is continuously biased to project from the body mount 12 by a compression spring 21 provided between the flange 16a of the AF joint shaft 16 and the camera body 11. The AF joint shaft 16 is rotated by a drive (not shown).

Figure 3:
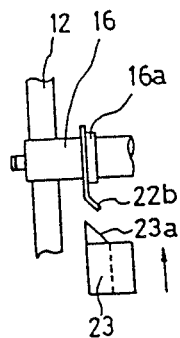
FIG. 3 is a right side elevational view of a main part of FIG. 1.

The second association arm 20b of the second intermediate lever 20 is associated with the AF joint shaft 16. Namely, the association arm 20b has a leaf spring member 22 secured thereto by a machine screw 20c, so that an association hole 22a formed on the upper end of the leaf spring member 22 is engaged by the front portion of the flange 16a of the AF joint shaft 16. The leaf spring member 22 has a manual switching oblique face 22b (FIGS. 2 and 3), so that when the association hole 22a is pushed, in the direction shown by an arrow A in FIG. 3, by an inclined surface 23a of a manual switching member 23, the AF joint shaft 16 is retracted from the body mount 12 through the flange 16a.

Figure 4:
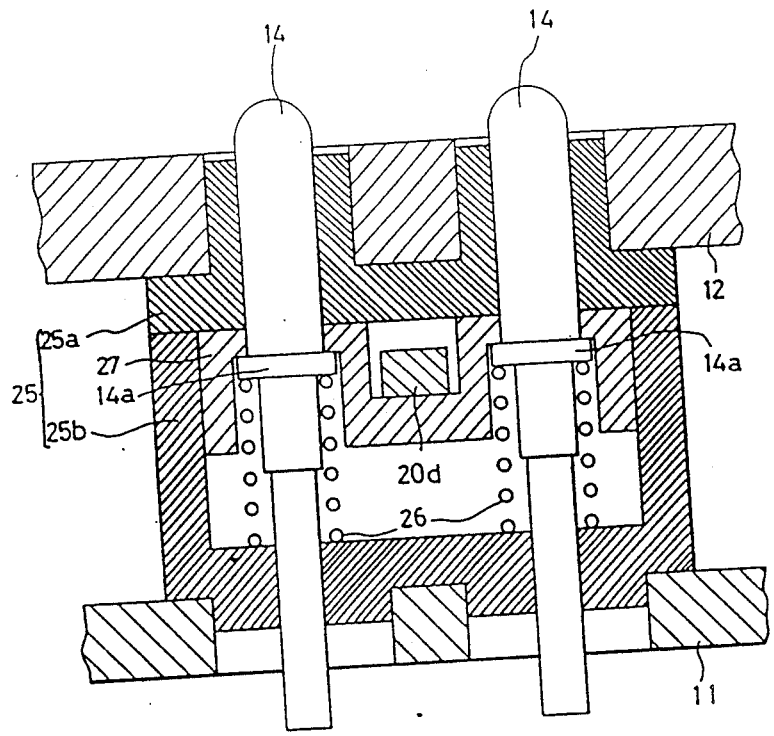
FIG. 4 in an enlarged sectional view of contact pins and the area around the pins.
Figure 5:
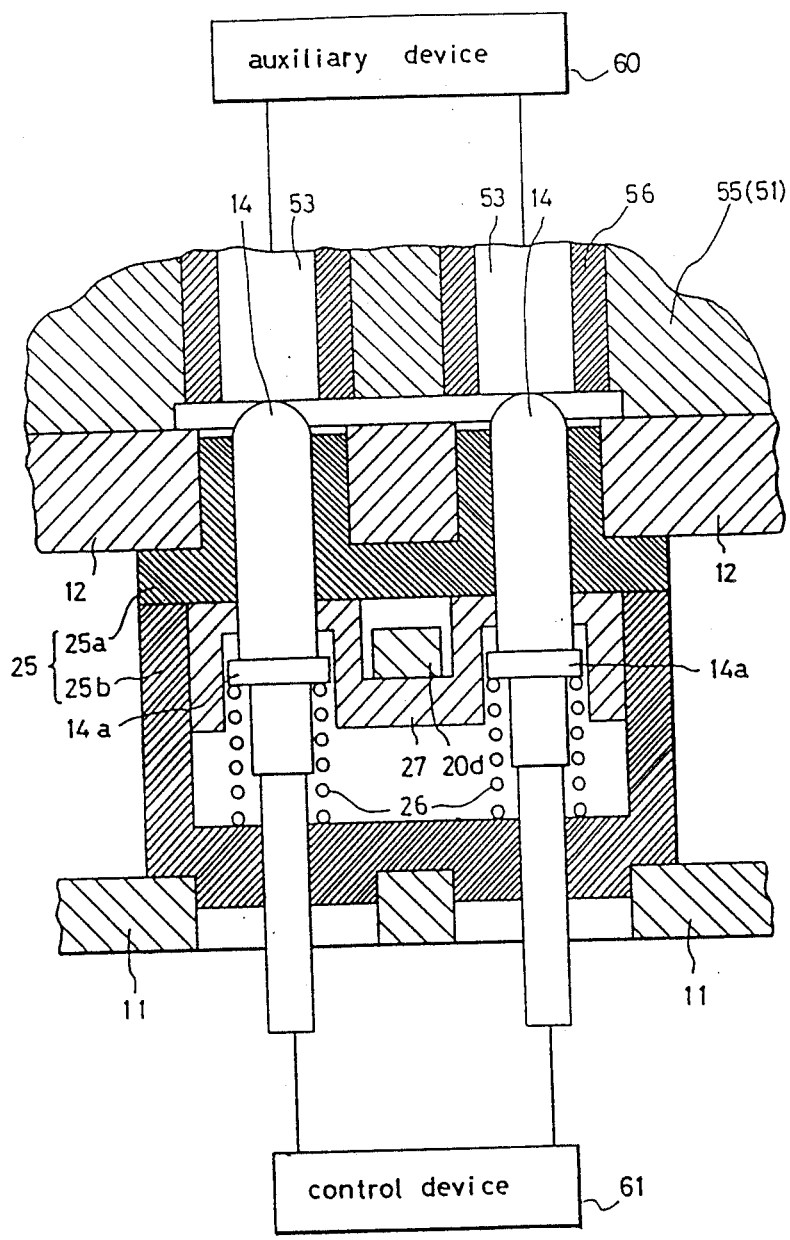
FIG. 5 is a sectional view showing the electrical connection between the contact pins and the contact members on the interchangeable lens side.

The second intermediate lever 20 has an association upstanding arm 20d which is provided in the vicinity of the association arm 20b and which is associated with the contact pins 14, as follows. The contact pins 14 are slidably fitted in an insulation box 25 integral with the body mount 12 (camera body 11), as shown in FIGS. 4 and 5. The insulation box 25 has a mount cover 25a on the mount side and a body cover 25b on the body side. Between the covers 25a and 25b are slidably fitted a pair of contact pins 14 which have flanges 14a. Between the flanges 14a and the body cover 25b are provided compression springs 26 to bias the contact pins 14 to project from the body mount 12. In the insulation box 25 is inserted a slide member 27 through which the contact pins 14 extend and which can be engaged by the flanges 14a. The slide member 27 is functionally connected to the association arm 20d of the second intermediate lever 20.

The contact members 53 on the interchangeable lens 51 are slightly retracted from the lens mount 55, as can be seen in FIG. 5. The insulation of the contact members is ensured by insulation collars 56. The contact members 53 of the interchangeable lens 51 are connected to an auxiliary device 60 (FIG. 5), such as a motor or data source in the interchangeable lens 51. The contact pins 14 on the camera body side are connected to another device such as a control device 61 for the auxiliary device 60 (FIG. 5).

In an interchangeable lens camera as constructed above, when the body mount 12 is aligned with and connected to the lens mount 55 to mount the interchangeable lens 51 to the camera body 11, the mount lock member 13 and the AF joint shaft 16, both projecting from the body mount 12, are pressed against the compression springs 17 and 21, so that the upper ends of the mount lock member 13 and the AF joint shaft 16 are flush with the surface of the body mount 12.

When the mount lock member 13 is pushed in, the mount lock releasing member 15 integral therewith is also pushed in, and the first intermediate lever 18 rotates about the shaft 19b through the arm 15a to move the lower arm 18b forward. As a result, the second intermediate lever 20 rotates to move the association arm 20b backward with the help of the association of the lower arm 18b and the association arm 20a. Consequently, the AF joint shaft 16 which is associated with the association arm 20b through the association hole 22a of the leaf spring member 22 and the flange 16a is pushed in against the compression spring 21. Noted that the AF joint shaft 16 is retracted from the body mount 12 not only under direct force exerted by the lens mount 55, but also by the mount lock member 13 being pushed by the lens mount 55.

Upon manual switching, that is, when the inclined surface 23a of the manual switching member 23 is pressed against the manual switching oblique surface 22b to retract the AF joint shaft 16 from the body mount, only the leaf spring member 22 rotates about the machine screw 20c in the direction of retraction of the AF joint shaft, so that the second intermediate lever does not move with the leaf spring member 22. Therefore, the association arm 20d of the second intermediate lever 20 does not move, so that the AF joint shaft 16 can be retracted alone without retracting the contact pins 14 from the body mount 12. In this case (retraction of the AF joint shaft), neither the transmission of photographing data between the camera body 11 and the interchangeable lens 51, nor the power supply therebetween, are adversely influenced.

When the second intermediate lever 20 rotates, the contact pins 14 are also retracted through the association arm 20d. Therefore, when the association arm 20b is retracted, the association arm 20d is retracted and accordingly the slide member 27 is retracted, so that the slide member 27 causes the contact pins 14 to be retracted through the flange 14a against the compression springs 26. Therefore, if the interchangeable lens 51 is rotated relative to the camera body 11, no contact between the contact pins 14 and contact members 53 and the lens mount 55 takes place, thus resulting in the prevention of rubbing and separation and wear of the surface treatment layer on the contact pins 14 and the contact members 53.

When the lock hole 52 on the lens mount 55 is registered with the mount lock member 13 by rotating the interchangeable lens 51, the mount lock member 13 and the contact pins 14 are projected toward the lens by the compression springs 17 and 26, so that the mount lock member 13 is fitted into the lock hole 52 to establish an electrical connection between the contact pins 14 and the contact members 53 (FIG. 5). As a result, the photographing information from the interchangeable lens 51 can be transmitted to the camera body 11, and the electrical power of the camera body 11 can be supplied to the motor incorporated in the interchangeable lens 51.

At the same time, the first and second intermediate levers 18 and 20 which are associated with the mount lock member 13 (mount lock releasing member 15) rotate, so that the AF joint shaft 16 is projected from the body mount 12 by the compression spring 21 to come into engagement with the driven shaft 54.

When the interchangeable lens 51 is detached from the camera body 11, the mount lock releasing member 15 is pushed in, so that the mount lock member 13 which is integral with the mount lock releasing member 15 is retracted into the body mount 12 to disengage the same from the lock hole 52 of the lens mount 55. At the same time, the first intermediate lever 18 and the second intermediate lever 20 rotate in the same direction as that of rotation thereof when the mount lock member 13 is pushed by the lens mount 55 upon mounting the interchangeable lens 51 to the camera body 11. As a result, the AF joint shaft 16 and the contact pins 14 are retracted from the body mount 12.

Consequently, the interchangeable lens 51 becomes free to rotate. Therefore, the interchangeable lens 51 can be detached from the camera body 11 by rotating the same by a predetermined angular displacement in the direction opposite to that when it is attached to the camera body 11. Upon detaching, the contact pins 14 are retracted from the body mount 12, and accordingly, there is no possibility that the contact pins 14 rub against the associated contact members 53 and the lens mount 55. As soon as the interchangeable lens 51 is detached from the camera body 11, the mount lock member 13, the contact pins 14 and the AF joint shaft 16 are projected from the body mount 12 toward the initial positions by the compression springs 17, 26 and 21, respectively.

Although there are two contact pins 14 in the illustrated embodiment mentioned above, the number of the contact pins are not limited thereto and can be either one or more than two.

As can be understood from the foregoing, according to the present invention, in an interchangeable lens camera in which the contact members are provided on the mount surfaces to transmit the photographing data and/or to supply the electrical power between the interchangeable lens and the camera body, when the mount surfaces of the interchangeable lens and the camera body are brought into contact with each other and are relatively rotated to attach and detach the interchangeable lens to and from the camera body, no rubbing takes place between the contact members between the contact members and the mount surfaces. As a result, wearing and separation of the surface treatment layers which are provided on the surfaces of the contact members to decrease the contact resistance therebetween can be prevented thus resulting in an establishment of a reliable contact therebetween. In particular, the present invention can be advantageously applied to contact members for the power supply, especially since the problems of such an increased contact resistance and an incomplete connection between the contact members more serious in contact members for power supply rather than in contact members for signal transmission.

I claim:

1. A mounting apparatus for an interchangeable lens camera having a mount lock member which is provided on a body mount of a camera body and which can be disengageably engaged within a lock hole provided on the interchangeable lens mount, a mount lock releasing member which moves in association with the mount lock member and which is adapted to retract the mount lock member from the body mount when the mount lock member is pushed in, and at least one contact member respectively on the body mount and the lens mount which are adapted to be brought into contact with each other when the interchangeable lens is locked to the camera body, wherein the at least one contact member provided on the camera body comprises at least one contact pin which can be retractably projected from the body mount and which is continuously biased to project from the body mount, said contact pin, said mount lock releasing member and said mount lock member being associated with each other in such a way that in response to the mount lock member being retracted from the body mount the contact pin is also retracted from the body mount.

2. A mounting apparatus according to claim 1, further comprising a first intermediate lever which is adapted to rotate about a vertical shaft provided on the bottom of the camera body, wherein said contact pin is provided on one end of the first intermediate lever and said mount lock releasing member is operatively connected to a second end of the first intermediate lever.

3. A mounting apparatus according to claim 2, wherein said mount lock releasing member is formed integrally with the mount lock member.

4. A mounting apparatus according to claim 2, further comprising a second intermediate lever which is positioned between the first intermediate lever and the mount lock releasing member.

5. A mounting apparatus according to claim 2, wherein said camera body has a drive shaft which is adapted to be projected and retracted from the body mount and which is continuously biased to be projected.

6. A mounting apparatus according to claim 5, further comprising a drive mechanism in the camera body for driving the drive shaft.

7. A mounting apparatus according to claim 5, wherein said drive shaft is provided on said one end of the first intermediate lever.

8. A mounting apparatus according to claim 5, further comprising an insulation box which is secured to the body mount to receive said contact pin therein for sliding movement.

9. A mounting apparatus according to claim 8, wherein said contact pin has a flange located in the insulation box.

10. A mounting apparatus according to claim 9, further comprising a compression spring located between the flange of the contact pin and the insulation box for biasing the contact pin so as to project from the body mount.

11. A mounting apparatus according to claim 1, wherein said contact pin is a power supply pin which supplies electrical power from or to the interchangeable lens to or from the camera body.

12. A mounting apparatus according to claim 1, wherein said contact pin is a signal pin which transmits information between the interchangeable lens and the camera body.

13. A mounting apparatus according to claim 1, wherein said at least one contact member comprises a plurality of contact pins.

14. A mounting apparatus for an interchangeable lens camera, in which an interchangeable lens has a lens mount, and a camera body to which the interchangeable lens is to be attached and locked has a lens mount, wherein the lens mount of the interchangeable lens can be detachably attached to the body mount of the camera body, wherein said body mount and said lens mount each have, on their surfaces, at least one contact member which are brought into contact with each other when the mount surfaces are connected to each other, and wherein the at least one contact member provided on the camera body has at least one contact pin which is adapted to be retractably projected from the body mount and which is continuously biased to project from the body mount, and further comprising means for retracting the at least one contact pin into the surface of the body mount, said means for retracting the at least one contact pin comprising a lock releasing member on the body mount for releasing the lock between the camera body and the interchangeable lens.

* * * * *

UNITED STATES PATENT AND TRADEMARK OFFICE
CERTIFICATE OF CORRECTION

PATENT NO. : 4,939,532

DATED : July 3, 1990

INVENTOR(S) : Tatsuhide TAKEBAYASHI

It is certified that error appears in the above-identified patent and that said Letters Patent is hereby corrected as shown below:

At column 3, line 44, insert ----from--- after "viewed".
At column 6, line 21, delete "between the" (second occurrence).
At column 6, line 22, delete "contact members".
At column 6, line 32, insert ---are--- before "more".

Signed and Sealed this

Thirteenth Day of October, 1992

Attest:

DOUGLAS B. COMER

Attesting Officer

Acting Commissioner of Patents and Trademarks